United States Patent [19]
Whittlesey et al.

[11] Patent Number: 5,671,055
[45] Date of Patent: Sep. 23, 1997

[54] APPARATUS, SYSTEM AND METHOD FOR LASER MEASUREMENT OF AN OBJECT SHAPE

[75] Inventors: Saunders N. Whittlesey, Amherst; Julie Harvey, Worthington, both of Mass.

[73] Assignee: Acushnet Company, Fairhaven, Mass.

[21] Appl. No.: 589,078

[22] Filed: Jan. 23, 1996

[51] Int. Cl.$^6$ ................................................ G01B 11/24
[52] U.S. Cl. .................. 356/376; 33/3 R; 33/515
[58] Field of Search ........................... 356/372, 376, 356/379, 383, 384; 33/3 R, 3 A, 3 B, 3 C, 6, 515; 12/146 L, 142 N; 128/779; 364/564; 359/201, 213, 226

[56] References Cited

U.S. PATENT DOCUMENTS

| | | | |
|---|---|---|---|
| 4,173,074 | 11/1979 | Newman et al. | 33/2 R |
| 4,360,972 | 11/1982 | Montgomery | 33/17 R |
| 4,406,544 | 9/1983 | Takada et al. | 356/376 |
| 4,745,290 | 5/1988 | Frankel et al. | 356/376 |
| 4,897,924 | 2/1990 | Tepley | 33/512 |
| 5,094,538 | 3/1992 | Reedman et al. | 356/376 |
| 5,123,169 | 6/1992 | White et al. | 33/3 R |
| 5,128,880 | 7/1992 | White | 364/550 |
| 5,164,793 | 11/1992 | Wolfersberger et al. | 356/376 |
| 5,170,570 | 12/1992 | Mays, Jr. | 33/512 |
| 5,195,030 | 3/1993 | White | 364/401 |
| 5,206,804 | 4/1993 | Thies et al. | 364/401 |
| 5,216,594 | 6/1993 | White et al. | 364/403 |
| 5,231,723 | 8/1993 | White et al. | 12/133 R |
| 5,237,520 | 8/1993 | White | 364/560 |
| 5,339,252 | 8/1994 | White et al. | 364/468 |
| 5,477,371 | 12/1995 | Shafir | 356/376 |

*Primary Examiner*—Hoa Q. Pham
*Attorney, Agent, or Firm*—Pennie & Edmonds LLP

[57] ABSTRACT

An apparatus for the laser measurement of the shape of an object or foot includes a base, a turntable, a linear slide, and a laser camera which slides on the linear slide. The turntable is attached to the base. The linear slide is attached to the turntable and extends from the turntable. The linear slide moves with the rotation of the turntable. The laser camera moves along and measures a first side and a second side of the object in order to create a three-dimensional profile of the object or foot shape. The apparatus further includes a robotic control and a computer. A method for measuring an object shape with the inventive apparatus provides a profile of the object or foot. The method also provides for the selection of a shoe size based upon the profile generated by the inventive apparatus.

34 Claims, 6 Drawing Sheets

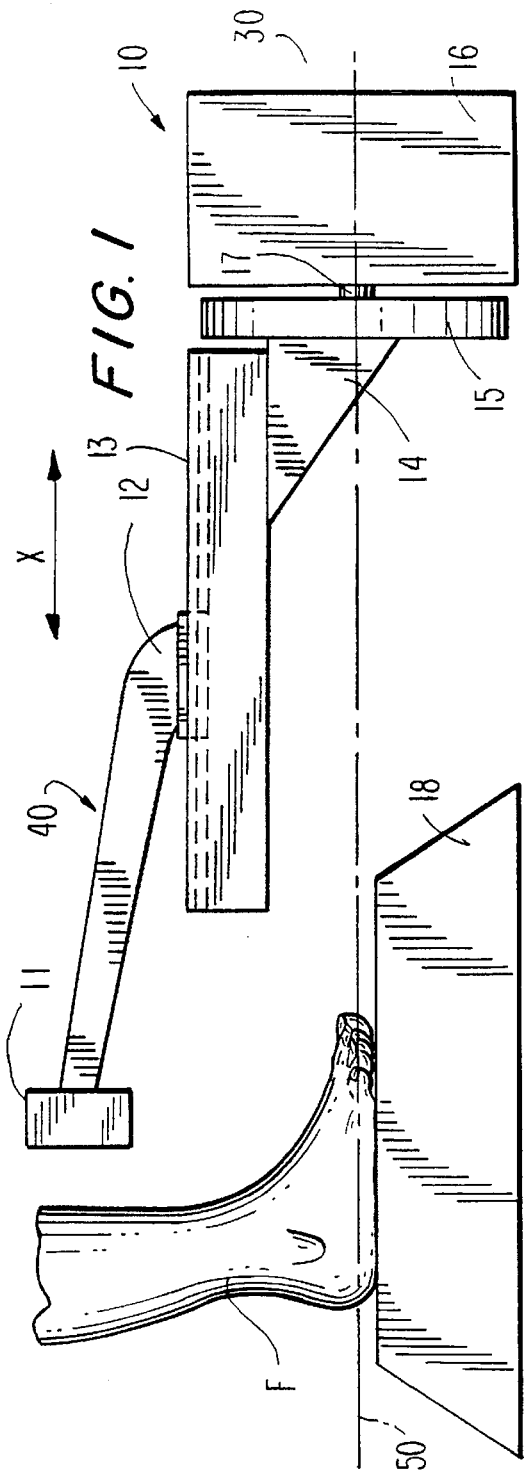
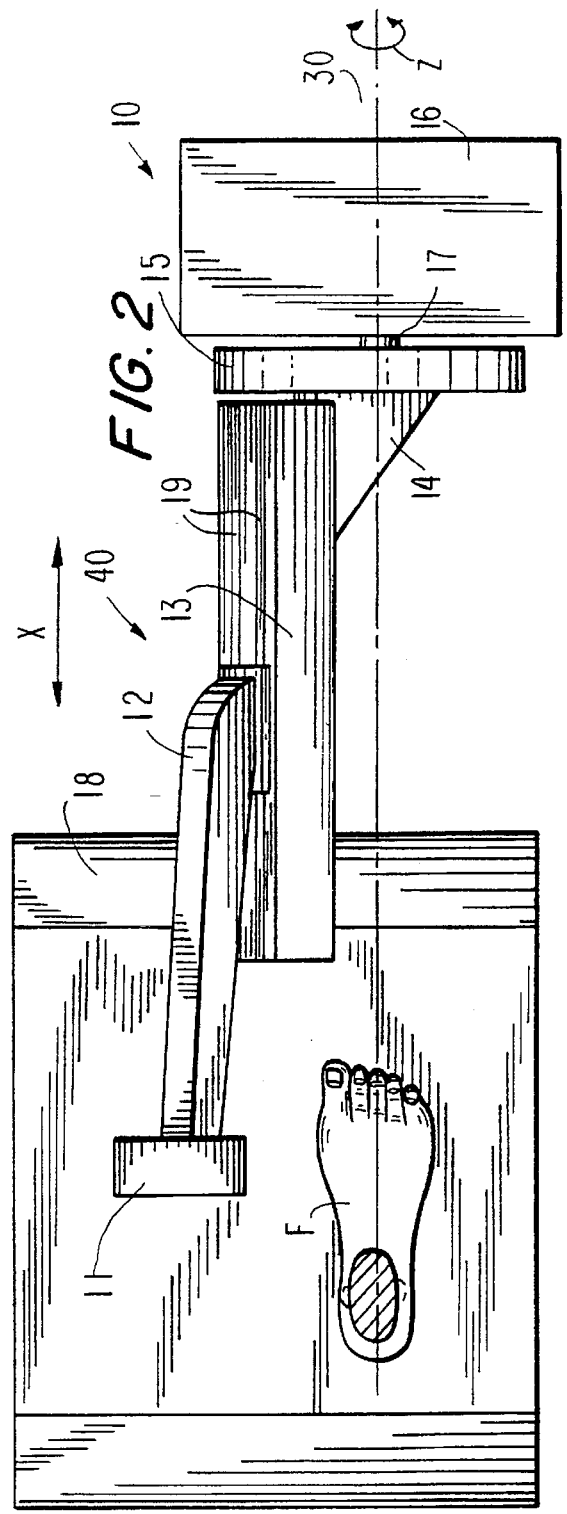

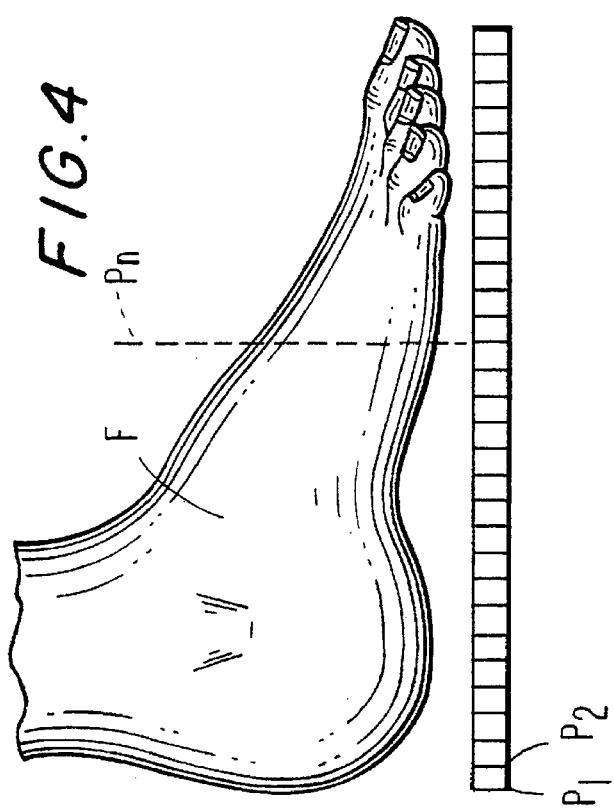
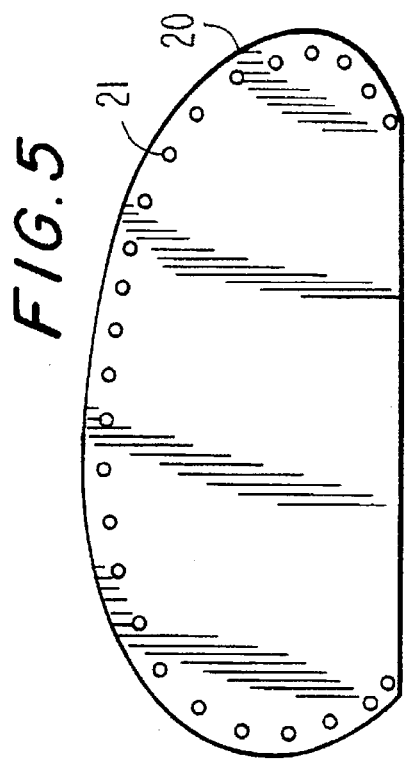
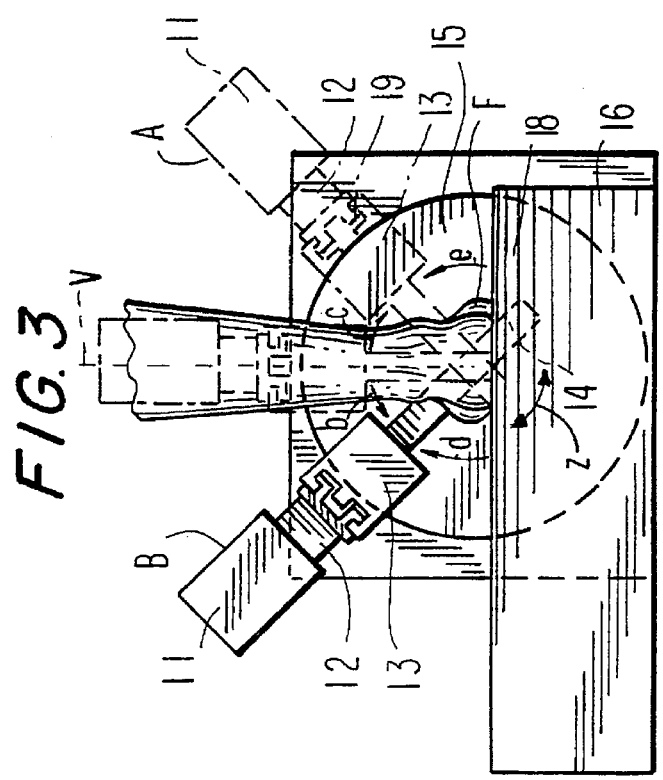

APPARATUS, SYSTEM AND METHOD FOR LASER MEASUREMENT OF AN OBJECT SHAPE

TECHNICAL FIELD

This invention relates generally to an apparatus, system, and method for measuring the shape of an irregularly shaped object. More particularly, this invention relates to an apparatus, system, and method for laser measurement of a foot. This invention also relates to a method for selecting a shoe size based upon the laser measurement of a foot.

BACKGROUND OF THE INVENTION

The footwear industry has become a large, specialized, and competitive environment. The industry has long-established methods of operation, one of which is to determine shoe size based upon the length and width of the foot. Shoe lasts for each shoe size are used in the manufacture of shoes. Therefore, properly sized lasts are essential for a successful shoe line. Properly fitting shoes are always important to consumers, but fit can be particularly important for consumers such as golfers, who use the relatively stiff golf shoes over varied terrain, for relatively long periods of time, and in varied weather conditions. Golfers often experience problems such as blistering caused by poorly fitting golf shoes. Thus, it is desirable to obtain the best fitting shoes to minimize such problems.

Various techniques have been proposed in the past for obtaining foot measurements using mechanical means. For example, most shoe stores commonly use a foot measuring scale known as the Brannock device, which is produced by the Brannock Device Company of Syracuse, N.Y. This device consists of a metal base plate with several sliding scales. It measures the length and width of the foot to determine an appropriate shoe size.

One problem associated with the Brannock device is that the foot measurements are only two dimensional in nature, measuring an absolute length from heel to toe and width. This method fails to take into consideration factors such as type of heel, e.g., bony versus padded; shape of the toes, e.g., square versus tapered; insole arch; and other characteristics. This device also fails to measure characteristics associated with medical problems such as bunions, which require larger shoe sizes to accommodate abnormalities of the foot.

More recent systems have proposed the use of laser beam measurement to determine the characteristics of the foot. U.S. Pat. No. 4,745,290 discloses an apparatus and method for making custom shoe lasts using a laser beam focused on the foot. This apparatus is fixedly positioned above the foot and only records data for the forward part of the foot, or forefoot. The method of determining shoe size utilized in this reference employs known techniques which use foot length and width.

U.S. Pat. No. 5,164,793 also employs a laser measurement system. This device employs a laser camera fixedly positioned over the foot. The heel of the foot, in this system, must be positioned at a precise location against a stop block. A three dimensional scan is performed in order to develop a three-dimensional profile of the forefoot of the user. Based upon the forefoot profile and the known position of the heel of the foot, the length and width of the foot are measured to determine the appropriate shoe size. One problem with this technique is that it does not measure the dimensions of the foot in the heel area. The heel area can be an important part of the foot measurement. Improperly fitted heels can cause the shoe to rub against the foot in the heel area and cause blisters. Very little study of the shape of the heel area has been done by the footwear industry.

Other devices are known which use lasers for measuring the characteristics of the bottom of the foot (U.S. Pat. No. 5,237,520). The most obvious problem with this type of scanning technique is that the upper dimensions of the foot are not obtained. Therefore, abnormalities in the shape of the foot may not be detected. Further, the means for determining shoe size described in U.S. Pat. No. 5,237,520 employs a conventional determination based upon the length and width of the foot.

U.S. Pat. No. 5,094,538 employs a pair of laser cameras which are fixedly positioned on a base. A light beam is directed toward an irregularly shaped object, such as a last, which is rotated on a surface. The laser cameras take readings from the last as it is rotated. The problem with this type of device is that it cannot measure a human foot. Since the platform upon which the object rests rotates, a single foot cannot be placed on the platform and measured. Even if both feet are placed on the rotating surface for measurement, the foot which is not being measured will obstruct the measurement of the other foot during at least part of the rotation of the foot.

It has been suggested to measure the foot and to display the profile of the foot in conjunction with footwear to show a customer how the bottom of the foot would fit in a shoe. It has also been suggested to store the foot measurement data for future last production. U.S. Pat. No. 5,206,804 describes a footwear measuring device in conjunction with a computerized footwear catalog. Customer data is gathered and stored, a visual display is generated of the bottom of the foot, and suggested footwear choices are displayed for the customer's selection.

SUMMARY OF THE INVENTION

This invention relates to improvements in measuring body parts, such as feet, or similar irregularly shaped objects, using laser beam measurement. When accurate foot measurements are obtained, a custom shoe last can be made or an optimum shoe size can be determined. In addition, measurement data can be stored in a database for future use in creating new shoe lasts.

The present invention provides an apparatus and system for measuring the three-dimensional shape of a foot. While the conventional method of measuring feet is to compare the foot's width and length to existing last dimensions, this invention generates a three-dimensional image of the entire foot and uses the entire three-dimensional image to determine a shoe size by comparing the image point-by-point to an existing last in order to better fit the foot to a proper shoe size.

The invention also provides data for producing new lasts from the measured foot data. Data from a single subject can be used to create custom shoe lasts. Alternatively, measured foot data for a large number of subjects can be stored and used to update the dimensions of lasts used in mass shoe production.

To obtain these advantages the foot is scanned in a particular way and the data obtained processed to create a three-dimensional volume profile of the object. The present invention is capable of scanning the entire foot including the toes, the ball, the waist, the arch, and the heel of the foot. Upon completion of the measurement of the object, a three-dimensional volume profile may be compared with known volume profiles such as existing shoe lasts to determine a proper shoe size, or, alternatively, the volume profile may be used to make a custom shoe last.

It is a feature of the invention that scanning is accomplished using a selected pattern of laser head scanning. It is a further feature of the system for laser measurement that a plurality of two-dimensional spaced-apart profiles are used to create a three-dimensional volume profile identifying a measured object.

In accordance with one aspect of the invention, an apparatus for laser measurement of an object shape includes a base, a rotatable member, a linear slide and a laser camera. The rotatable member is attached to the base and rotates from a first angle to a second angle. The linear slide has a first and second end. At the first end, the linear slide is attached to and extends from the rotatable member. The linear slide moves from a first position to a second position when the rotatable member is rotated. The laser camera is coupled to the linear slide and moves along the linear slide.

In operation, the rotatable member rotates the linear slide to the first position and the laser camera slides along the linear slide to measure the object. Then the rotatable member rotates to a second position and the laser camera moves along the linear slide to measure the object at the second position. Measurement at each position is performed at a plurality of locations. The laser camera may move on the linear slide while the rotatable member is rotating. It is preferred, however, that the laser camera moves on the linear slide for measurement only when the linear slide is in the first or second position.

The apparatus preferably includes a stand for resting the object or foot thereupon. This surface may be part of the base. The base preferably also includes a rotary fixture which is disposed thereon. The rotatable member rotates on the rotary fixture. The axis of rotation of the rotary fixture forms a longitudinal reference axis so that the linear slide moves in a direction which is parallel to the longitudinal reference axis. The laser camera moves along the linear slide in a line which is, likewise, parallel to the longitudinal reference axis. The object being measured is preferably positioned with the length of the object aligned with the longitudinal reference axis.

The linear slide may be attached to the rotatable member by an angle bracket. The linear slide preferably has at least one track disposed between the first and second ends. The laser camera may be coupled to the tracks for sliding on the linear slide. The laser camera preferably measures the object or foot while it is sliding in the direction from the second end to the first end of the linear slide.

The laser camera preferably includes a laser head and an arm which is attached to the laser head. The arm may be slidingly coupled to the linear slide and may reciprocate in the tracks on the slide. The laser head emits laser beams toward the object in order to measure the object and includes a laser beam transmitter and a laser beam receiver with a CCD receiving element.

The apparatus may also include a robotic control and a programmed computer. The robotic control may control the movement of the laser camera and the rotatable member. The computer is utilized to signal the laser camera to move and to emit laser beams intermittently. The computer also records measurement data. The apparatus may further include means for digitally combining the data from the measurements at the first and second positions to create a three-dimensional profile of the object shape.

In another aspect of the invention, a method for the laser measurement of an object shape includes positioning an object, such as a foot, for measurement, emitting laser beams toward the object, receiving reflected laser beams and processing the data obtained. The laser beams are emitted intermittently at the object by moving the laser camera along at least one side of the object. Reflected laser beam emissions are received from the object as data representative of the size and shape of the object at the locations where the laser beams are emitted. Processing the data results in the creation of a three-dimensional profile of the object's shape.

The intermittent emissions of laser beams are preferably made at constant intervals. The constant intervals may range from $\frac{1}{16}$ in. to $\frac{5}{8}$ in. apart. The preferred interval is $\frac{3}{8}$ in. The movement of the laser camera is preferably at a preselected constant speed. The object may be positioned for measurement with a long axis of the object aligned with a longitudinal reference axis. The movement of the laser camera during the laser beam emissions is preferably parallel to the longitudinal reference axis.

The method of laser measurement of an object may also include the steps of positioning the laser camera at a first position and passing the laser camera along a line parallel to the longitudinal reference axis. Then the laser camera is passed by a second side of the object along another line which is parallel to the longitudinal reference axis. Reflected laser light is received from the laser beam emissions and is recorded as data.

The laser beam emissions are preferably in the form of a vertical plane of light at each constant interval. A plurality of data points is received and recorded along the length of each vertical plane of laser light. Each vertical plane is aligned perpendicular to the longitudinal reference axis. The laser beam emissions from the laser camera occur along a line which is parallel to the longitudinal reference axis. The travel lines of the laser camera are above and offset from at least one side of the longitudinal reference axis.

The laser camera, during each measurement pass, preferably moves along a line which is parallel to the longitudinal reference axis. The laser camera may be positioned at about 30° to 60° above a plane upon which the object rests. The position of each laser beam emission during the first pass is preferably coordinated with the position of each emission during the second pass. The collection of data preferably occurs in the same direction of movement on each side of the object.

The method of the present invention also includes comparing the measurement data with known last dimensions in order to select a shoe size for a foot. The shoe size is determined by comparing the measurement data to known last dimensions. Selecting a shoe size includes comparing each vertical plane of data to a plurality of last dimensions. One way of performing this is to start with the smallest last and work upward in size to the largest last. Each vertical plane of data may be compared to each last dimension until a last is found in which less than two points on less than two of the vertical planes exceeds the last dimensions. When less than two points on less than two vertical planes are found to fit within a last, that last is selected as the recommended shoe size.

An alternative way of comparing the vertical data planes to a plurality of last dimensions is to start with the largest last size and work downward to the smallest last size. Each vertical plane of data is compared to each last dimension until a last is reached in which two or more data points on two or more vertical planes exceeds the last dimensions. When this occurs, the next larger last is then selected as the recommended shoe size.

Another alternative way of comparing the measurement data with known last dimensions in order to select a shoe size for a foot involves measuring the length and width of a foot from the three-dimensional profile of the foot to calculate a shoe size using a conventional Brannock scale. The length of the foot is measured from the rear of the heel to the tip of the farthest extending toe on the profile. The width of the foot is measured across the widest part of the profile.

Additional objects, advantages, and novel features of the invention will be set forth in part in the description which follows, and in part will become apparent to those skilled in the art upon examination of the following or may be learned by practicing the invention. The objects and advantages of the invention may be realized and attained by means of the instrumentalities and combinations particularly pointed out in the appended claims.

BRIEF DESCRIPTION OF THE DRAWINGS

FIG. 1 is a side elevational view of the apparatus in accordance with the present invention;

FIG. 2 is a perspective view of the apparatus of FIG. 1;

FIG. 3 is an end view of the movement of the apparatus from the rear of the heel of the foot;

FIG. 4 is a side elevational view of the foot and measurement planes of the apparatus;

FIG. 5 is a cross-sectional view of a vertical data plane of a foot within a last;

DETAILED DESCRIPTION OF THE PREFERRED EMBODIMENTS

Figure 5A:
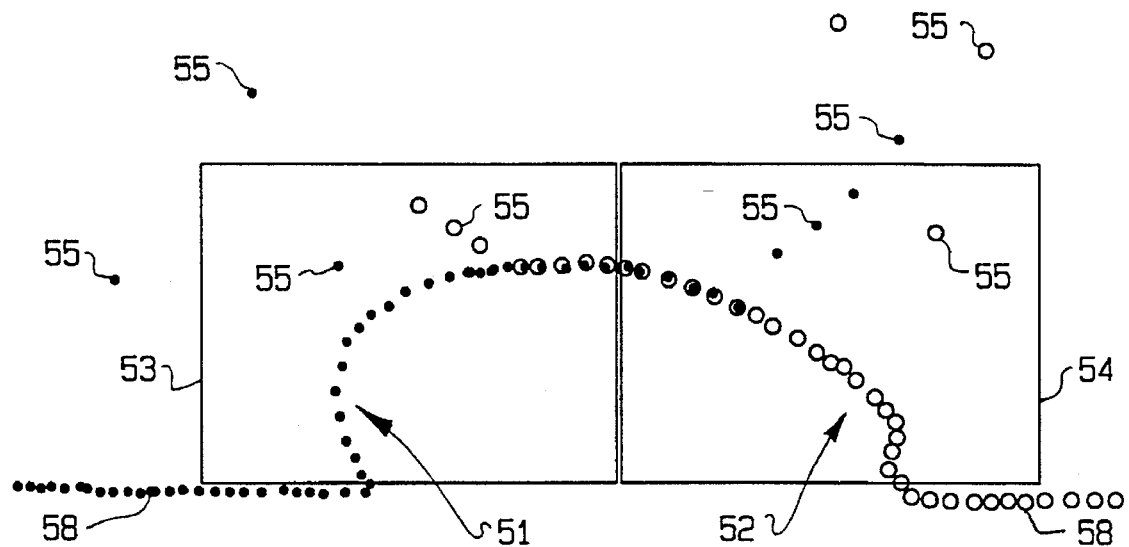
FIG. 5A is a cross-sectional view of unprocessed data for a vertical plane of data.

This invention provides a measurement technique which can be used to both measure the foot and to create a database to update the dimensions of standard shoe lasts used in mass manufacture. The present invention provides a measurement technique which includes the heel of the foot within the range of the measuring device.

FIGS. 1 and 2 show a preferred embodiment of the apparatus (10) of the subject invention. The apparatus (10) includes a fixture unit (30) and a laser camera unit (40). The foot (F) is placed for measurement before the fixture unit (30) on a surface (18) so that the long axis of the foot forms a longitudinal reference axis (50). FIG. 1 shows the apparatus (10) at its starting position with the laser camera unit (40) forward of the foot (F) to be measured. FIG. 2 shows a top perspective of the apparatus (10) at a starting position as the laser camera unit (40) translates along the side of the foot (F).

The fixture unit (30) includes a base unit (16), a rotary fixture (17), a turntable (15), an angle bracket (14), and a linear slide (13). The rotary fixture (17) is disposed within the base unit (16). The turntable (15) is attached to the rotary fixture (17) and rotates about the rotary fixture (17). The turntable (15) is rotated by a conventional stepper motor (not shown). An angle bracket (14) connects to the turntable (15) and to the linear slide (13) to support the linear slide on the turntable. As the turntable (15) rotates upon the rotary fixture (17), the linear slide (13) is rotated with the turntable from one side of the foot (F) to the other side, as shown by arrow Z in FIG. 2. The linear slide (15) has at least one track (19) disposed along its length. The tracks (19) on the linear slide (13) are parallel to the longitudinal reference axis (50). The linear slide (13) and rotary fixture (17) are produced by Techno Corp., a division of DSG Company of New Hyde Park, N.Y.

The laser camera unit (40) includes a laser head (11) and an arm (12). The laser head (11) is attached to the arm (12). The arm (12) is attached for sliding motion to the linear slide (13). Preferably, the arm (12) is disposed in the tracks (19) on the linear slide (13). The arm (12) reciprocates in the tracks (19) to move the laser camera unit (40) back and forth along the side of the foot (F), as shown by arrow x in FIGS. 1 and 2. The motion of the arm (12) along the side of the foot is parallel to the longitudinal reference axis (50).

In operation, the laser head (11) moves from its original position, forward of the foot, to the rear of the heel and back to its original position forward of the foot. Therefore, a feature of the current invention is that the laser head can move in directions both parallel and perpendicular to the longitudinal reference axis of the foot (50).

Preferably, in order to measure the foot (F), the forward part of the foot (F) faces the apparatus (10). The foot (F) does not have to be placed at a precise location in order to be properly measured, but preferably the longitudinal reference axis (50) of the foot (F) is aligned with the axis of rotation of the rotary fixture (17). The foot may rest on a stand or surface (18). The base unit (16) can be attached to the stand or surface (18), although this is not necessary to the invention.

FIG. 3 shows the movement of the fixture unit (30) and the laser camera unit (40) during measurement of the foot (F). The foot (F) is placed for measurement so that the forward part of the foot (F) faces the apparatus (10). In operation, the turntable (15) starts at position A at angle c from the vertical (V). Angle c may be in the range of about 35° to 45° and is preferably about 40°. The location of positions A and B may, alternatively, be defined by an angle of rotation (e, d) from the surface of the stand (18) upon which the foot (F) rests. This angle (e) is preferably between about 30 and 60° and most preferably about 50°. When the turntable (15) is rotated, as shown by arrow Z, the laser camera unit (40) and the linear slide (13) become tilted away from the foot so that the bottom of the laser head (11) is closer to the foot (F) than the top of the laser head (11). Since the opening through which the laser beams are emitted during measurement is located at the bottom of the laser head (11), when the laser head is tilted, the laser beams will be emitted directly toward the foot.

Rotation of the turntable (15) to position A will result in the arm (12) and laser head (11) being clear of the leg of the individual so that the leg of the subject will not interfere with the movement of the laser camera unit (40) along the side of the foot.

With the laser camera unit (40) at position A, the arm (12) moves the laser head (11) quickly from the retracted original position past the heel of the foot (F). The arm (12) then reciprocates back to its original retracted position.

The laser head is preferably an M-Spot-280 Miniature Laser Range Camera, manufactured by Servo Robot, Inc. of Boucherville, Quebec, Canada. The movement of the laser head from the heel to the toe is preferably performed at a constant selected speed so that the foot is measured at approximately ⅜ in. (1 cm.) intervals. The speed of movement of the laser camera unit is dictated by the capabilities of the laser controller, which is the computer which controls the operation of the laser head. The speed of movement for the M-Spot-280 laser head, in order to scan the foot at ⅜ in. (1 cm.) intervals, is preferably about ¾ in. (2 cm.) per second. The M-Spot-280 can move as quickly as 20 cm. per second. The range of speed, however, will vary depending upon the type of camera unit and overall configuration of the device.

As the arm (12) retracts, the laser head (11) emits laser beams intermittently against the side of the foot (F). The laser beams are preferably emitted as a sequence of co-planar points of light forming a vertical plane of light against the object being measured.

After the laser head has moved along and measured one side of the foot, the turntable (15) rotates past the vertical position (V) and then rotates to position B at angle b, all the while remaining clear of the leg. The same procedures are followed along the second side of the foot (F). First the arm (12) moves the laser head (11) to a position past the heel of the foot (F). As the arm (12) retracts to its original position at a constant speed, the laser head (11) emits beams of light intermittently against the side of the foot (F). After measuring the second side of the foot (F), the arm (12), in its retracted position, is returned to its starting position (A) for the next measurement sequence.

As tile laser head (11) measures the foot (F), it emits laser beams of light at constant intervals along the length of the foot. The light is reflected back to the laser head which receives the reflected light.

It should be noted that the order of measuring the sides of the foot is not critical to the inventive system. Positions A and B of FIG. 3 may be reversed. Further, it should be noted that the measurement of the foot from heel to toe is not critical to the inventive system. A foot measurement from toe to heel will provide equally useful results. Any starting and stopping positions are acceptable provided that the entire foot is measured. In addition, it should be noted that, while two measurement positions are described above, more than two measurement positions may be used.

FIG. 4 shows the constant intervals along the length of the foot (F). The laser head begins to take readings at $P_1$ until it reaches the toes of the foot at $P_n$. The constant interval for measurement is preferably in the range of 1/16 in. to ⅝ in., with ⅜ in. (1 cm.) being most preferred. This constant interval should provide a sufficient number of data planes to detect any significant shape on the surface of the foot. A ⅜ in. (1 cm.) interval will detect surface shapes of ⅜ in. (1 cm.) or larger.

The laser beam emitted by the laser head (11) during measurement is emitted as a sequence of co-planar points forming a vertical plane of light in a plane perpendicular to the longitudinal reference axis (50), shown in FIG. 1. The vertical span of the vertical plane of light so emitted is at least 2.5 inches so as to cover the entire height of the foot. Preferably, the span of the laser beam is 4 to 5 inches. The span can be smaller or greater depending upon the distance that the laser head (11) is positioned from the foot (F) and, if an object other than a foot is being measured, the overall size of the object to be measured.

An M-Spot-280 laser head (11) emits a vertical plane of light onto the side of the foot through an opening in the base of the unit. The laser light is then reflected back to the laser head where a CCD receives the reflected light. For each laser beam emitted, a laser head of this type records 256 data points. Each data point represents a point on the vertical plane of light.

Figure 5B:
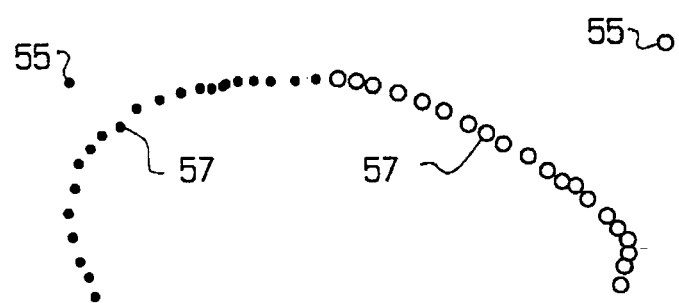
FIG. 5B is a cross-sectional view of the vertical plane of 5A after the data has been partially processed.

FIG. 5 shows a vertical plane of data (21) within a last (20) after the data has been processed. FIG. 5A shows the measurement data in an unprocessed form for one vertical plane of data (21). For ease in viewing, not all 512 points obtained by the inventive apparatus are shown. The points shown are provided for example purposes only. FIG. 5B shows the data of FIG. 5A in a partially processed form.

The data obtained during measurement of the foot is in two parts representing the first and second sides of the foot. As is shown in FIG. 5A for demonstration purposes, one side of data is represented by the solid points (51) and another side of data is represented by the open points (52). Each set of data includes 256 points. The two sets are combined or merged to form one vertical plane of 512 points. The original 512 point set represents the foot in combination with the floor (58) and bad points (55), i.e., those which do not represent the foot or the floor. A search region (53, 54) is selected for each side of data in order to remove points which represent the floor (58) and to remove as many bad points (55) as possible while still maintaining a large enough region to measure the entire cross-section of the foot. The search regions (53, 54) are defined so as to maintain all points which represent the foot measurement. All points which fall outside of the search region are discarded.

FIG. 5B shows the data after points which fall outside of the search regions have been discarded. As can be seen, this technique serves to remove, in addition to floor and bad points, points which represent the foot but which overlap between the two sides. As is shown in FIG. 5B, the foot profile has taken shape at this stage. The remaining bad points (55) are then recognized by measuring the distance between the bad points and the majority of the points. Since the distance between the bad points (55) and the foot points (57) is much greater than the distance between the individual foot points (57), the computer recognizes this difference and discards the bad points (55). In order to make the data more manageable, the number of points is reduced to preferably about 25 (21), as is shown in FIG. 5. The final 25 points (21) are selected from the foot points (57), of FIG. 5B, by selecting points at as even a spacing as possible along the length of the data string (57). The remaining data profile (20) represents the cross-section of the foot (F).

Figure 6A:
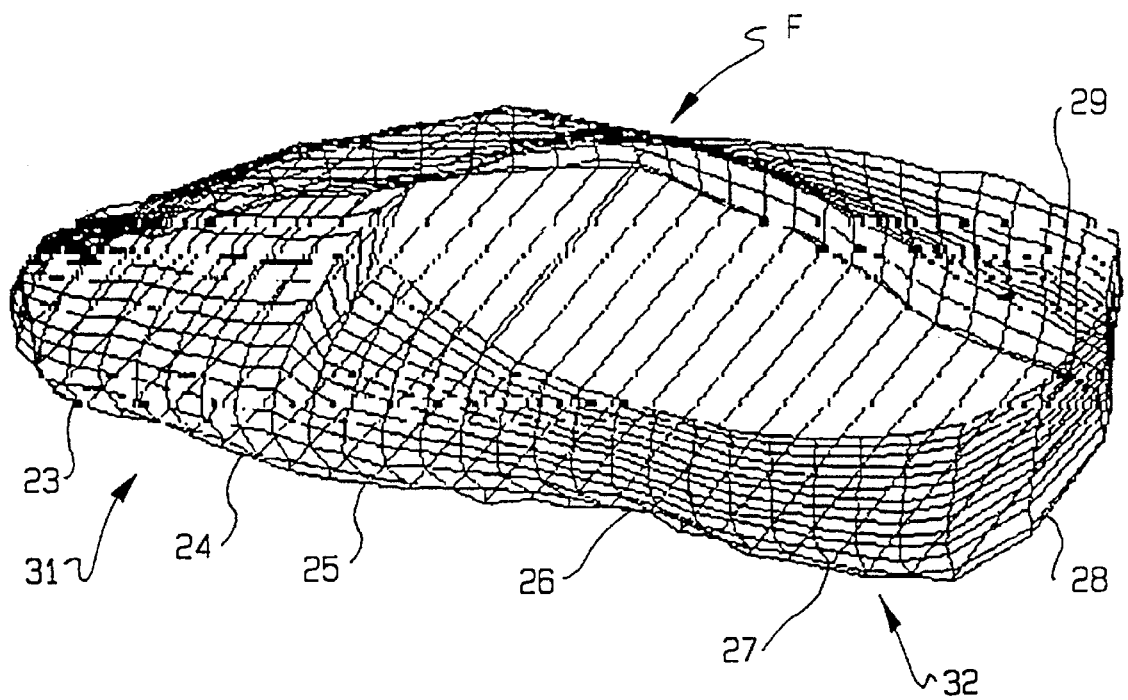
FIG. 6A is a three-dimensional profile of the foot created by the apparatus.
Figure 6B:
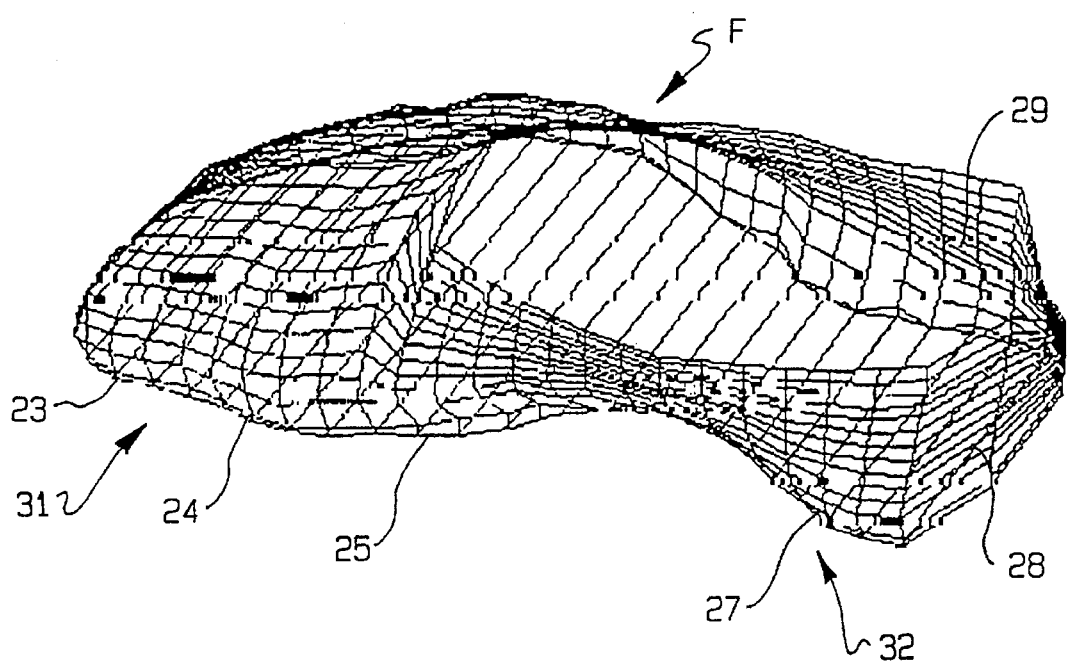
FIG. 6B is a three-dimensional profile of the foot created by the apparatus.

FIGS. 6A and 6B show two three-dimensional profiles of the foot (F) obtained from the inventive apparatus. The profile shown in FIG. 6A shows an American size 12 foot with a low arch. FIG. 6B shows an American size 9 foot with a high arch. Both profiles presented show the foot (F) from the medial side, but the profiles may be rotated in actual use to show different views of the foot (F).

As is shown in FIGS. 6A and 6B, features of the entire foot are obtained from the inventive apparatus. The three-dimensional profiles include definition of the forefoot (31) and the hindfoot (32). The forefoot profile includes the toes (23), ball (24), waist (25), and arch (26). The arch (26) separates the forefoot (31) from the hindfoot (32). The hindfoot extends from the arch (26) to the rear heel (28) and includes the medial side of the heel (27) and the lateral side of the heel (29).

Figure 7:
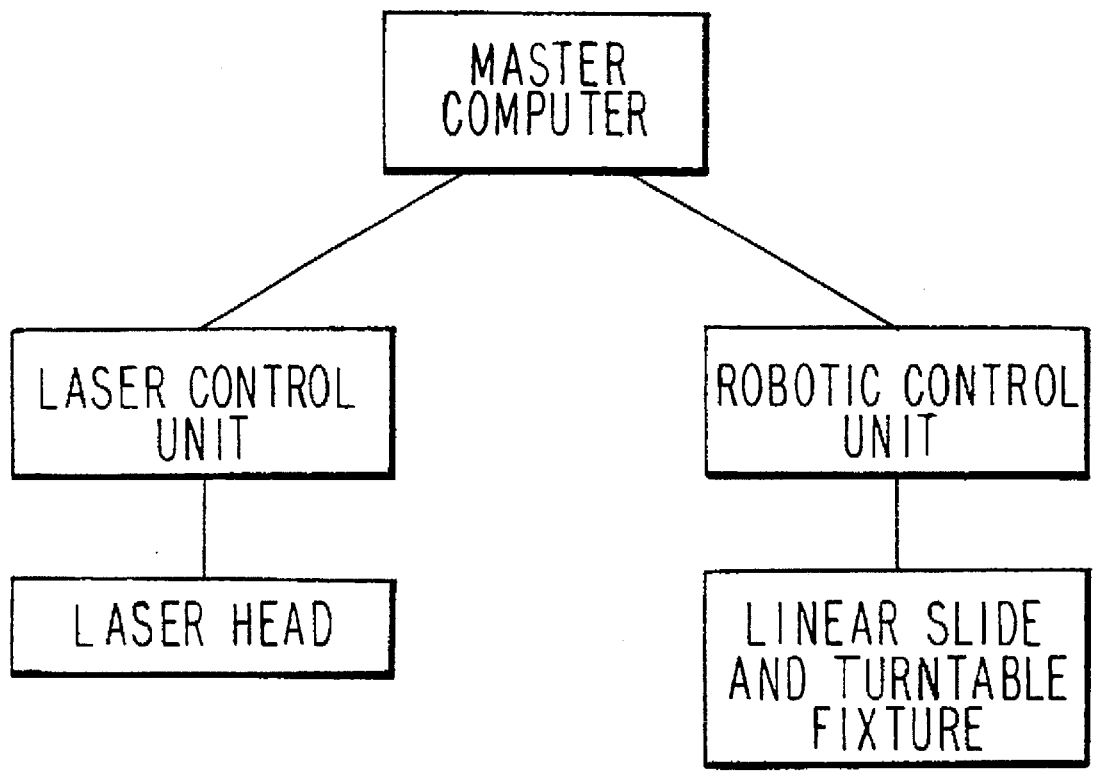
FIG. 7 is a schematic drawing of the inventive system.

The system of the inventive apparatus is shown in the flow chart of FIG. 7. The inventive system includes a computer, a laser control unit, and a robotic control unit. The laser head (11) of the apparatus (10) is controlled by the laser control unit which is, in turn, controlled by the computer. The linear slide (13) and the turntable (15) of the apparatus are controlled by the robotics control unit which is, in turn, controlled by the computer. The computer is preferably a Macintosh Quadra 950, but this is not critical and many other models could instead be used. Both the laser control unit and the robotics control unit are slaves to the computer.

The robotic control unit controls the movement of the fixture unit (30) and the laser camera unit (40) about the foot (F). The robotic control unit is produced by Warner Electric of Bristol, Connecticut. In operation, the computer signals the robotic control to move the turntable (15) to a first position (A). The computer then signals the laser camera unit (40) on the linear slide (13) to slide past the foot so that the laser head is positioned past the rear heel (28) of the foot (F). The robotic control then signals the laser camera unit (40) to return to its retracted position at a constant speed. The computer then signals the robotic control to rotate the turntable (15) to the other side of the foot to a second position (B). Then the computer signals the robotics to move the arm (12) to a position past the rear of the heel (28). On the return of the arm (12) to its retracted position, the arm (12) moves at a constant speed until it has moved along the length of the foot (F). The movement along the side of the foot (F) during each pass is parallel to the longitudinal reference axis (50).

The computer also controls the laser head (11) through the laser control unit. The computer is the master while the laser control unit is a slave computer to the master computer. The master computer controls the emission of laser beams against the foot (F) through the laser control unit. The laser control unit is available from Servo Robot, Inc. of Boucherville, Quebec, Canada, Model No. CSR4000.

In operation, as the arm (12) moves from the rear heel (28) to the tip of the toes (23), the computer signals the laser control unit which signals the laser head (11) to emit vertical planes of light against the side of the foot (F) at constant intervals. A CCD receiving element within the laser head (12) receives the reflected laser light. The laser control unit records the reflected laser light at each vertical plane on each side of the foot. Each vertical plane of data is then transferred to the master computer. The master computer takes the data from each side of the foot and combines it to form a vertical plane or slice of the foot at each constant interval. The master computer is programmed to take the vertical planes of data and combine them to form a three-dimensional profile of the foot, as shown in FIGS. 6A and 6B.

Figure 8:
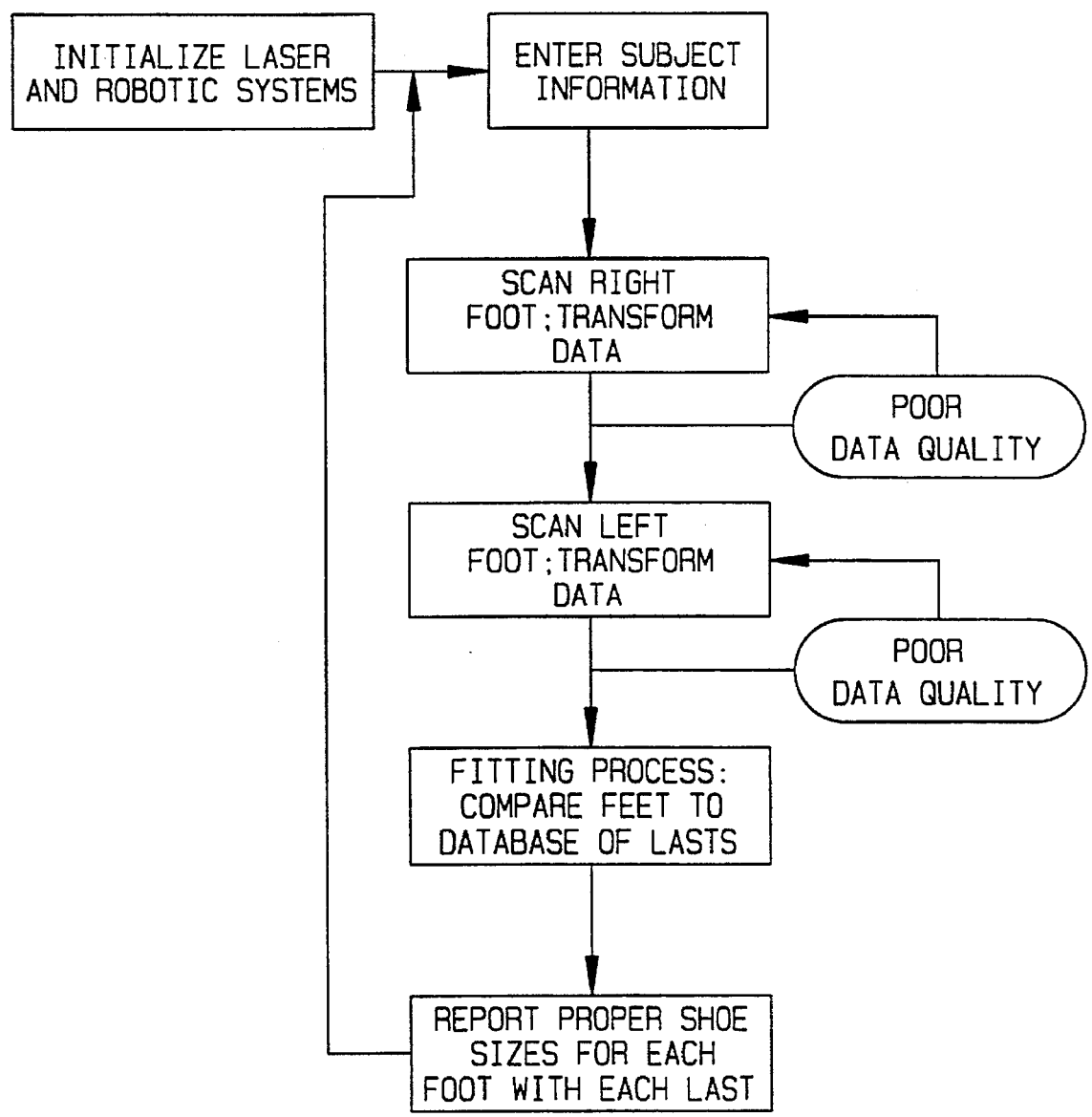
FIG. 8 is a flow chart for operating the system.

FIG. 8 depicts a method for determining a shoe size of the foot utilizing the inventive system. First, the system is engaged by initializing the laser and robotic system parameters and inputting into the computer standard last information which will be compared with the measurements of the subject's foot.

Lasts can be digitized using the apparatus and system of the current invention by placing the last for measurement, rather than a foot. Lasts are stored in the computer as a set of geometric regions which correspond to cross sections of the last. The Macintosh Quadra 950 system graphics defines a region structure for the purpose of defining the shapes of windows on the screen. The Macintosh system also defines many operations on regions which include determining whether a point lies within a region. The Macintosh system routines define the last cross-sections (20) as regions and the foot cross-sections (21) as coplanar points (as shown in FIG. 5). Thus, a vertical plane (21) fits entirely in a last (20) if all foot points lie within the last geometric region. A foot entirely fits a last if all foot cross-sections fit within all last sections.

Next, subject information such as name, age, sex, etc. is entered. This information is stored with the foot measurement data for later use in foot morphology studies.

The right foot of the subject is measured by making a first pass along one side of the foot and a second pass along the other side of the foot. During this step, the data is gathered and checked for quality, e.g., all points recorded are out of a predetermined range. The master computer is programmed to check the data for inconsistences such as movement of the subject or space between the sock and foot of the subject.

The left foot of the subject is then measured by making a first pass along one side of the foot and a second pass along the other side of the foot. The data is gathered and, again, checked for data quality. If poor quality of the data results in it being unusable due to movement detected or a similar fault, the operator of the system will be instructed to re-measure the foot.

It should be noted that the previous steps may be reversed in order, as it is not necessary that one particular foot be measured before the other.

The data generated during each pass is transformed into a three-dimensional profile of the foot through a series of steps. First, a rotational transformation is applied to all points in order to obtain a common reference frame. Second, the data is checked to determine a) which points are on the surface upon which the foot rests, b) which points are noise, c) which points represent the surface of the foot, and d) which points overlap from the first side measurement and the second side measurement of the foot. The resulting points represent the surface of the foot, but are too numerous for practical purposes (usually over 20,000 points for the entire foot image). Thus, approximately 25 points are selected from each vertical plane of data to use in the fitting process, as defined above for FIGS. 5, 5A and 5B. The 25 points are selected by choosing points which are as evenly spaced as possible around the cross-section of the foot. A three-dimensional profile of the foot is generated by combining each vertical plane of data.

The next step is to compare the feet measurements to the database of lasts for a particular shoe style, or for a variety of shoe styles, in order to select a shoe that fits the subject's foot. The result of this comparison may then be reported to the subject for each foot.

In this step, a preferred comparison technique is to compare each vertical data plane of the subject's right foot with the last data stored in the computer. The last data is stored in the computer as geometric regions while the subject's foot data is stored as vertical planes of data points. The data points of each vertical plane are compared to the geometric regions for a plurality of last sizes starting with the smallest right foot last. Each vertical plane of data represents a cross-section of the foot and includes 25 points. Each of the 25 points for each vertical plane is compared to the geometric region to determine whether any data points extend past the boundary of the last, as set by the geometric planes. A vertical plane of data does not fit when 2 or more of the 25 points exceeds the boundary of the geometric planes. Thus, if only one of the 25 points exceeds the boundary, the vertical plane of data is considered to "fit." If the vertical plane is found to not fit, then the next larger last is compared with the foot data. This comparison continues until less than two of the vertical planes of data exceeds the last geometric planes. If more than one vertical plane exceeds the boundary of the geometric planes, the selection process will continue until less than two vertical planes do not fit. Once less than two vertical planes of data are found to exceed the boundary of the last, the current last is selected as the recommended shoe size for the subject. This procedure is repeated for the left foot.

It should be noted that last data may also be stored as a series of data points rather than as geometric regions. Geometric regions, however, are currently preferred. In addition, it should be noted that the comparison technique described above may be performed in the opposite direction, starting with the largest last and working downward to the smallest last. In this technique, a last will be rejected if two or more points on two or more vertical planes exceed the geometric planes.

An alternative comparison technique utilizes the Brannock measurement method in combination with the inventive system. This technique involves measuring the length and width of the foot from the three-dimensional profile generated by the inventive system for each foot. The length is measured from the rear of the heel (28) to the farthest extending toe. The width is measured at the widest part of the foot. The conventional Brannock scale can then be utilized to determine the shoe size for each foot.

By the above defined procedures, custom shoe lasts can be determined for each subject. Alternatively, the data obtained from the foot measurement may be stored by the computer for later foot morphology studies where the data can be used to create a model for new shoe lasts for mass manufacture.

It should further be noted that other measurement devices rather than lasers are contemplated for use in the inventive system. These include ultrasound scanning, patterned light scanning using video cameras, MRI scanning, and CAT Scan Technology scanning.

We claim:

1. An apparatus for the laser measurement of an object comprising:

a base;

a rotatable member attached to the base and rotatable about a rotational axis;

a linear slide having a first end and a second end, the first end being attached to and extending from the rotatable member, said rotatable member being capable of rotating the linear slide from at least a first position to a second position; and a laser camera slidingly coupled to the linear slide for movement along the linear slide to obtain measurements of the object at a plurality of locations along the slide, wherein the rotatable member rotates the linear slide between the first and second positions to obtain measurements of the object at both positions of the slide.

2. The apparatus of claim 1 which further comprises a stand for resting the object thereupon.

3. The apparatus of claim 1, wherein the base includes a surface for resting the object thereupon.

4. The apparatus of claim 1, wherein the base further comprises a rotary fixture disposed thereon, said rotatable member rotating on said rotary fixture about the rotational axis.

5. The apparatus of claim 4, wherein the rotational axis defines a longitudinal reference axis and, when the rotatable member rotates, the linear slide moves in a direction parallel to the longitudinal reference axis, and the laser camera moves along the linear slide in a line which is parallel to the longitudinal reference axis.

6. The apparatus of claim 5, wherein a length of the object is placed for measurement in alignment with the longitudinal reference axis.

7. The apparatus of claim 1, wherein the linear slide is attached to the rotatable member by an angle bracket.

8. The apparatus of claim 1, wherein the linear slide has at least one track disposed between the first end and the second end.

9. The apparatus of claim 1, wherein the laser camera moves along the linear slide for measurement only when the linear slide is in the first or second position.

10. The apparatus of claim 1, wherein measurement occurs while the laser camera is sliding from the second end to the first end of the linear slide.

11. The apparatus of claim 1, wherein the laser camera comprises:

a laser head; and an arm attached to said laser head, said arm being slideably coupled to the linear slide for movement along the linear slide.

12. The apparatus of claim 11, wherein the arm reciprocates in at least one track disposed between the first and second ends of the linear slide.

13. The apparatus of claim 11, wherein the laser head emits laser beams toward the object for measurement of the object.

14. The apparatus of claim 11, wherein the laser head comprises:

a laser beam transmitter; and a laser beam receiver with a charge coupled device (CCD) receiving element.

15. The apparatus of claim 1 which further comprises:

a robotic control for controlling the movement of the laser camera and rotatable member;

a computer for signalling the laser camera to move, to emit laser beams intermittently, and to record measurement data; and means for digitally combining the data to create a profile of the object shape.

16. A method for the laser measurement of an object shape with one dimension of the object shape defining a length comprising:

positioning an object for measurement;

intermittently emitting laser beams from a laser camera as the camera translates along the length of a first side of the object;

rotating the laser camera to a second side of the object;

intermittently emitting laser beams from a laser camera as the camera translates along the length of a second side of the object;

receiving reflected laser beam emissions from the object as data representative of the size and shape of the object at the locations where the laser beams are emitted; and processing the data to obtain a three-dimensional profile of the object.

17. The method of claim 16, wherein the laser beam emissions are made at constant intervals along the length of the object.

18. The method of claim 17 wherein aid constant intervals are between about $1/16$ and $5/8$ of an inch apart.

19. The method of claim 17, wherein the object is positioned for measurement with the length of the object being generally aligned with a longitudinal reference axis.

20. The method of claim 19, wherein the movement of the laser camera during the laser beam emissions is parallel to the longitudinal reference axis.

21. The method of claim 19, which further comprises:

positioning the laser camera at a first side of the object;

passing the laser camera by the first side of the object along a line parallel to the longitudinal reference axis;

positioning the laser camera at a second side of the object; and passing the laser camera by the second side of the object along a line parallel to the longitudinal reference axis.

22. The method of claim 21 wherein the position of each laser beam emission during the first pass is coordinated with the position of each laser beam emission during the second pass, said receiving of data occurring the same direction on either side of the object.

23. The method of claim 19, wherein the laser beam emissions define vertical planes of light at each constant interval, each vertical plane being aligned perpendicular to the longitudinal reference axis.

24. The method of claim 23, wherein a plurality of data points is received and recorded along the length of each vertical plane.

25. The method of claim 24, wherein the object is a foot.

26. The method of claim 25, which further comprises comparing the processed data with known last dimensions for selecting a shoe size for said foot.

27. The method of claim 26, wherein comparing the processed data with known last dimensions includes comparing each vertical plane of data to a plurality of last dimensions, starting with the smallest last and working upward in size to the largest last, each said vertical plane of data being compared to each last dimension until a last is reached in which less than two points on less than two of the vertical planes exceeds the last dimensions, said last then being selected as the recommended shoe size.

28. The method of claim 26, wherein comparing the processed data with known last dimensions includes comparing each vertical plane of data to a plurality of last dimensions, starting with the largest last and working downward in size to the smallest last, each said vertical plane being compared to each last dimension until a last is reached in which two or more data points on two or more vertical planes exceeds the last dimensions, the next larger last then being selected as the recommended shoe size.

29. The method of claim 26, wherein the shoe size for the foot is selected by measuring a length and a width of the foot from the three-dimensional profile of the foot to calculate a shoe size using a conventional Brannock scale.

30. The method of claim 29, wherein the length of the foot is measured from the rear of the heel to the tip of the farthest extending toe and the width of the foot is measured across the widest part of the foot.

31. The method of claim 19, wherein the laser camera during each measurement pass moves along a line parallel to said longitudinal reference axis which is about 45° to 55° above a plane upon which the object rests.

32. The method of claim 19, wherein the laser beam emissions occur along a line parallel to the longitudinal reference axis where at least one line is above and offset from at least one side of the longitudinal reference axis.

33. The method of claim 16, wherein the laser beam emissions are vertical planes of light.

34. The method of claim 16, wherein the laser camera moves at a preselected constant speed during measurement.

* * * * *